(12) United States Patent
Shu et al.

(10) Patent No.: US 9,328,255 B2
(45) Date of Patent: May 3, 2016

(54) INK-JET INK FOR COLOR FILTER AND METHOD FOR PREPARING THE SAME AND METHOD FOR PREPARATION OF COLOR FILTER

(71) Applicant: BOE TECHNOLOGY GROUP CO., LTD., Beijing (CN)

(72) Inventors: Shi Shu, Beijing (CN); Jianshe Xue, Beijing (CN); Jisheng Zhao, Beijing (CN); Lin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/689,646

(22) Filed: Apr. 17, 2015

(65) Prior Publication Data

US 2015/0218402 A1    Aug. 6, 2015

Related U.S. Application Data

(62) Division of application No. 13/491,846, filed on Jun. 8, 2012, now Pat. No. 9,040,603.

(30) Foreign Application Priority Data

Jun. 9, 2011  (CN) .......................... 2011 1 0154188

(51) Int. Cl.
*C09D 125/14* (2006.01)
*C09D 11/322* (2014.01)
*C09D 11/101* (2014.01)

(52) U.S. Cl.
CPC ............ *C09D 125/14* (2013.01); *C09D 11/101* (2013.01); *C09D 11/322* (2013.01)

(58) Field of Classification Search
CPC .................................................. C09D 125/14
USPC .................................................. 523/160, 161
See application file for complete search history.

(56) References Cited

U.S. PATENT DOCUMENTS

| 5,250,576 | A | 10/1993 | DesMarais et al. | |
|---|---|---|---|---|
| 7,008,994 | B1 * | 3/2006 | Waki ........................ | C08J 3/212 523/160 |
| 8,951,449 | B2 * | 2/2015 | Shu ........................ | C08F 212/08 252/586 |
| 2002/0128379 | A1 | 9/2002 | Hasegawa et al. | |
| 2004/0171738 | A1 | 9/2004 | Harz et al. | |
| 2005/0234189 | A1 | 10/2005 | Lee et al. | |
| 2006/0281834 | A1 | 12/2006 | Lee et al. | |
| 2007/0211126 | A1 | 9/2007 | Bauer et al. | |
| 2008/0032321 | A1 | 2/2008 | Ginty et al. | |
| 2008/0032328 | A1 | 2/2008 | Cline et al. | |
| 2009/0245610 | A1 | 10/2009 | Can et al. | |
| 2010/0020274 | A1 * | 1/2010 | Zhang ................. | C09B 67/0069 349/106 |
| 2011/0091081 | A1 | 4/2011 | Sarachan et al. | |
| 2012/0315386 | A1 | 12/2012 | Shu et al. | |

FOREIGN PATENT DOCUMENTS

| CN | 1529740 | A | 9/2004 |
|---|---|---|---|
| CN | 1690087 | A | 11/2005 |
| CN | 1816389 | A | 8/2006 |
| CN | 101162364 | A | 4/2008 |
| CN | 101323708 | A | 12/2008 |
| CN | 101323725 | A | 12/2008 |
| CN | 101633805 | A | 1/2010 |
| CN | 101659813 | A | 3/2010 |
| CN | 101760042 | A | 6/2010 |
| CN | 101921497 | A | 12/2010 |
| CN | 101955708 | A | 1/2011 |
| EP | 1403343 | A1 | 3/2004 |
| EP | 1548040 | A1 | 6/2005 |
| EP | 1788044 | A1 | 5/2007 |
| JP | 2005-330298 | A | 12/2005 |
| JP | 2006-117954 | A | 5/2006 |
| JP | 2007-162003 | A | 6/2007 |
| JP | 2009-529443 | A | 8/2009 |
| KR | 20120137293 | A | 12/2012 |
| WO | 2010/120278 | A1 | 10/2010 |

OTHER PUBLICATIONS

N. Bechthold, et al; "Miniemulsion Polymerization: Applications and New Materials", Macromol. Symp. 151, pp. 549-555; Article first published online Nov. 14, 2000.
Franca Tiarks, et al; "Encapsulation of Carbon Black by Miniemulsion Polymerization", Macromol. Chem. Phys. vol. 202, No. 1, pp. 51-60; Article first published online Jan. 25, 2001.
Hu Zhenkun, et al; "Progress in Preparation and Applications of Nanocolorants", Progress in Chemistry. vol. 18, No. 1, Jan. 2006, 10 Pages.
Extended European Search Report mailed Oct. 18, 2012; Appln. No. 12171317.6-2102.
Extended European Search Report dated Jul. 4, 2015; Appln. No. 12818014.8-1901/2737454 PCT/SE2012050851.
International Search Report; PCT/CN2012/078517.
International Preliminary Report on Patentability dated Jan. 14, 2014; PCT/CN2012/078517.
First Chinese Office Action dated May 27, 2013; Appln. No. 201110154188.1.
Second Chinese Office Action dated Nov. 18, 2013; Appln. No. 201110154188.1.
Third Chinese Office Action dated Apr. 21, 2014; Appln. No. 201110154188.1.
Korean Office Action Non-Final dated Nov. 14, 2013: Appln. No. 10-2012-0061551.
Korean Office Action dated May 30, 2014; Appln. No. 10-2012-0061551.

(Continued)

*Primary Examiner* — Doris Lee
(74) *Attorney, Agent, or Firm* — Ladas & Parry LLP

(57) ABSTRACT

The disclosure provides an ink-jet ink for color filter and a method for preparing the same, as well as a method for preparing of a color filter. The ink-jet ink for color filter comprising, by weight, 10 to 50 parts of aqueous nano pigment dispersion and 51 to 95 parts of a cold curing component.

9 Claims, 3 Drawing Sheets

(56) References Cited

OTHER PUBLICATIONS

Korean Office Action dated Dec. 20, 2013; Appln. No. 10-2012-7028551.
Korean Notice of Allowance of Patent dated Nov. 14, 2014; Appln. No. 10-2012-0061551.
USPTO RR dated Apr. 17, 2014 in connection with U.S. Appl. No. 13/491,846.
USPTO NFOA dated Jul. 3, 2014 in connection with U.S. Appl. No. 13/491,846.
USPTO NOA mailed Jan. 22, 2015 in connection with U.S. Appl. No. 13/491,846.
USPTO NFOA dated Oct. 11, 2013 in connection with U.S. Appl. No. 13/643,369.
USPTO FOA dated Mar. 7, 2014 in connection with U.S. Appl. No. 13/643,369.
USPTO NOA mailed Aug. 29, 2014 in connection with U.S. Appl. No. 13/643,369.

* cited by examiner

```
┌─────────────────────────────────────────────────────────────────┐
│ mixing 5wt% to 40wt% of styrene, 1wt% to 30wt% of a (meth)acrylic ester │
│ monomer, 0.5wt% to 5wt% of an acidic monomer, 0.25wt% to 5wt% of a      │
│ cross-linking monomer, 0.05wt% to 0.5wt% of an emulsifier adjuvant, 0.05wt% │─── S101
│ to 0.5wt% of an oil soluble initiator so as to form a mixture, and adding 0.5wt% │
│ to 10wt% of an organic pigment or dye, and optionally 0.05wt% to 0.5% of a │
│ nucleating promoter to the mixture to obtain an oil phase solution after being │
│ completely dissolved                                                     │
└─────────────────────────────────────────────────────────────────┘
                                   ↓
┌─────────────────────────────────────────────────────────────────┐
│ dissolving 0.05wt% to 2wt% of an emulsifier and 0.05wt% to 2wt% of buffering │─── S102
│ agent to 40wt% to 90wt% of deionized water to obtain an aqueous phase   │
│ solution                                                                 │
└─────────────────────────────────────────────────────────────────┘
                                   ↓
┌─────────────────────────────────────────────────────────────────┐
│ mixing the oil phase solution with the aqueous phase solution to obtain a fine │─── S103
│ emulsion after agitation and homogenization                             │
└─────────────────────────────────────────────────────────────────┘
                                   ↓
┌─────────────────────────────────────────────────────────────────┐
│ heating the fine emulsion to the reaction temperature, adding 0.05wt% to │
│ 0.5wt% of a water soluble initiator to initiate polymerization, and after the │─── S104
│ polymerization, adjusting pH value to 9~10; and obtaining an aqueous pigment │
│ dispersion by filtration                                                 │
└─────────────────────────────────────────────────────────────────┘
                                   ↓
┌─────────────────────────────────────────────────────────────────┐
│ adding a cold curing component to the aqueous nano pigment dispersion, and │─── S105
│ mixing evenly to obtain the ink-jet ink for color filter                │
└─────────────────────────────────────────────────────────────────┘
```

Fig.1

```
┌─────────────────────────────────────────────────────────────────────┐
│ mixing 35g of styrene with polymerization inhibitor removed by evaporation, │
│ 5g of n-butyl acrylate, 5g of methyl methacrylate, 5g of acrylic acid, 0.8g of │
│ 1,6-hexanediol diacrylate, 1.7g of tetrapropylene glycol diacrylate, 0.5g of   │──S201
│ p-divinylbenzene, 1g of cetyl alcohol, and 0.5g of benzoyl peroxide form a │
│ mixture, and dissolving 1.8g of organic pigment or dye to be dispersed into the │
│ aforesaid mixture to form an oil phase solution after being completely │
│ dissolved │
└─────────────────────────────────────────────────────────────────────┘
                                    ↓
┌─────────────────────────────────────────────────────────────────────┐
│ dissolving 3g of sodium dodecyl sulfate and 2.2g of sodium bicarbonate into │──S202
│ 120g of deionized water to form an aqueous phase solution │
└─────────────────────────────────────────────────────────────────────┘
                                    ↓
┌─────────────────────────────────────────────────────────────────────┐
│ mixing the oil phase solution with the aqueous phase solution; after agitating at │
│ 800 rpm for 15 min, transferring the mixgture into a ultrasonic homogenizer │──S203
│ for ultrasonic homogenization to form a fine emulsion │
└─────────────────────────────────────────────────────────────────────┘
                                    ↓
┌─────────────────────────────────────────────────────────────────────┐
│ transferring the fine emulsion into a reactor; for example, heating to 80 °C with │
│ aeration of nitrogen gas; adding 0.5g potassium persulfate to initiate │
│ polymerization; after the reaction of 3h, cooling to room temperature; │──S204
│ adjusting pH value to 9 with aqueous ammonia; and obtaining the aqueous │
│ nano pigment dispersion by filtration │
└─────────────────────────────────────────────────────────────────────┘
                                    ↓
┌─────────────────────────────────────────────────────────────────────┐
│ adding 600g of acrylic acid ester emulsion containing diacetone acrylamide │
│ into the prepared pigment dispersion, and then adding 10g of adipoyl │──S205
│ hydrazide; and mixing the additions evenly to obtain the ink-jet ink for color │
│ filter │
└─────────────────────────────────────────────────────────────────────┘
```

Fig.2

INK-JET INK FOR COLOR FILTER AND METHOD FOR PREPARING THE SAME AND METHOD FOR PREPARATION OF COLOR FILTER

BACKGROUND

One or more embodiments of the disclosure relates to an ink-jet ink for color filter and a method for preparing the same, as well as a method for preparing of a color filter.

A color filter is a major component of a liquid crystal display (LCD). White light from a backlight is filtered into red light, green light and blue light respectively through three kinds of color filters (Red, Green and Blue) of the color filter substrate, which are eventually mixed in human eyes as color images. The color filter substrate accounts for more than 30% of the costs for a liquid crystal display panel. Therefore, it is a core technique that has to be mastered in the development of the thin film transistor liquid crystal display (TFT LCD) industry. Currently, the conventional methods for the manufacture of the color filter substrate include a pigment dispersion method and an ink-jet method.

In the pigment dispersion method, color photoresists are coated on a substrate by way of spin coating, and a pixel filter layer is formed by exposure and developing. A color photoresist is a kind of photoresist with color pigment evenly dispersed in it, and has the property of light curing and thermal curing. For a color photoresist of RGB (Red:Green: Blue), three procedures, including coating, exposure and developing, are required to finally form a color filter. However, for the manufacture of large size panels, the pigment dispersion method has the disadvantages of severe waste of raw materials, as well as complicated procedures and excessively high costs of equipment.

In the ink-jet method, inks containing RGB pigments are simultaneously eject into the black matrix of a transparent substrate, and the pixel filter layer is formed with the volatilization of the solvent in the ink droplets. Using the ink-jet method, the RGB color layer can be formed in a single step, which greatly simplifies the process of manufacture and reduces the costs.

However, the performance of ink(s) has great effect on the product property when the ink-jet method is employed to prepare the color filters. The current ink(s) suffers from the following primary issues: (1) a large amount of organic solvents are used as the media that give rise to a large amount of VOC (volatile organic compounds), which bring about potential risk of fire and is detrimental to the environment and the health of artisans; (2) the viscosity of the ink(s) is directly related to the molecular weight and the addition amount of resin, and is hard to adjust; and (3) the formation of the pixel filter layer requires a light curing or thermal curing step, which consumes a huge amount of energy. Therefore, the current ink-jet ink(s) for color filter suffers from the common issues of high production of VOC, difficulty in adjustment of viscosity, and high energy consumption for curing the pixel filter layer.

SUMMARY

In one aspect the disclosure provides an ink-jet ink for color filter comprising, by weight, 10 to 50 parts of aqueous nano pigment dispersion; and 51 to 95 parts of a cold curing component.

In another aspect, the disclosure provides a method for preparing an ink-jet ink for color filter, comprising:

mixing 5 wt % to 40 wt % of styrene, 1 wt % tip 30 wt % of a (meth)acrylic ester monomer, 0.5 wt % to 5 wt % of an acidic monomer, 0.25 wt % to 5 wt % of a cross-linking monomer, 0.05 wt % to 0.5 wt % of an emulsifier adjuvant, and 0.05 wt % to 0.5 wt % of an oil soluble initiator so as to form a mixture, and adding 0.5 wt % to 10 wt % of an organic pigment or dye, and optionally 0.05 wt % to 0.5% of a nucleating promoter to the mixture to obtain an oil phase solution after being dissolved;

dissolving 0.05 wt % to 2 wt % of an emulsifier and 0.05 wt % to 2 wt % of buffering agent to 40 wt % to 90 wt % of deionized water to obtain, an aqueous phase solution;

mixing the oil phase solution with the aqueous phase solution to obtain a fine emulsion after agitation and homogenization;

heating the fine emulsion to an reaction temperature, adding 0.05 wt % to 0.5 wt % of a water soluble initiator to initiate polymerization, after the polymerization adjusting pH value to 9~10, and obtaining an aqueous nano pigment dispersion by filtration; and adding a cold curing component to the aqueous nano pigment dispersion, and mixing evenly to obtain the ink-jet ink for color filter.

In a further aspect, the disclosure provides a method for preparing of a color filter, comprising coating a black light-shielding material on a substrate, and forming a light-shielding pattern by a patterning process; dropping the above-mentioned ink-jet ink for color filter onto the portion of the substrate other than the light-shielding pattern; and curing the substrate under a predetermined temperature to obtain the color filter.

In one or more embodiments of the disclosure, an aqueous system is employed so as to avoid the high VOC production caused by volatilization of solvents, which reduces environmental pollution, ensures the health of artisans and in the meantime reduces the risk of fire. Moreover, since an aqueous system is employed, the viscosity of the prepared ink can be adjusted by a thickening agent or modifying pH values. Compared with the conventional method, this adjustment is not dependent on the molecular weight or addition amount of the resin, thus the adjustment is flexible. Furthermore, due to the addition of a cold curing component, curing at room temperature is possible, which reduces energy consumption and costs compared to the high temperature curing of the conventional technology.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

The present disclosure will become more fully understood from the detailed description given hereinafter and the accompanying drawings which are given by way of illustration only and thus are not limitative of the present disclosure and wherein:

FIG. 1 is a flow chart of a method for the preparation of the ink-jet ink for color filter;

FIG. 2 is a flow chart of the method for the preparation of the ink-jet ink for color filter;

DETAILED DESCRIPTION

Figure 3:
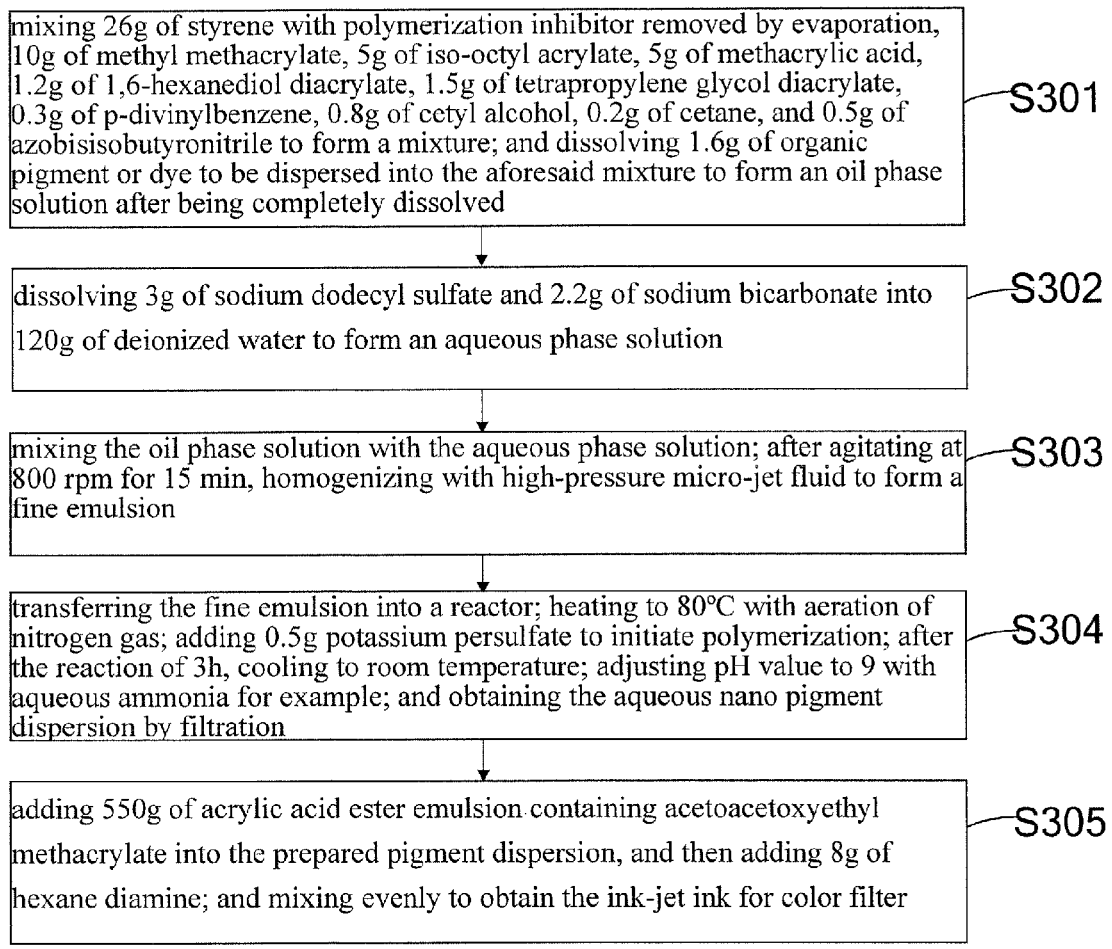
FIG. 3 is another flow chart of the method for the preparation of the ink-jet ink for color filter.

The technical solutions of the embodiments of the disclosure are described in a clear and complete manner in association with the accompanying drawings as follows. Apparently, the described embodiments are merely a part of, rather than, the all embodiments of the disclosure. Based on the described embodiments of the disclosure, other embodiments obtained by those of ordinary skill in the art without conducting creative work should fall into the scope of the disclosure.

Embodiment 1

An embodiment of the disclosure provides an ink-jet ink for color filter comprising, by weight, 10 to 50 parts of aqueous nano pigment dispersion and 51 to 95 parts of a cold curing component. The sum of the amounts of the aqueous nano pigment dispersion and the cold curing component is equal to 100 parts.

An example of the aqueous nano pigment dispersion may comprise 0.5 wt % to 10 wt % of an organic pigment or dye, 7 wt % to 80 wt % of a copolymer of styrene and an acrylic ester, and 40 wt % to 90 wt % of deionized water.

An example of the cold curing component may comprise, by weight, 40 to 80 parts of an acrylic ester emulsion containing a first cold curing component and 1 to 20 parts of a second cold curing component.

For example, the first cold curing component may comprise an active carbonyl group, and the second cold curing component may comprise a hydrazide; or the first cold curing component may comprise an acetoacetyloxy group, and the second cold curing component may comprise polyamines The ink-jet ink for color filter provided in the embodiment of the disclosure comprises, by weight, 10 to 50 parts of aqueous nano pigment dispersion and 51 to 95 parts of a cold curing component. Thus, an aqueous system is employed so as to avoid the high VOC production caused by volatilization of solvents, which reduces environmental pollution, ensures the health of artisans and in the meantime reduces the risk of fire. Moreover, since an aqueous system is employed, the viscosity of the ink can be adjusted by a thickening agent or modifying pH values. Compared with the conventional method, this adjustment is not dependent on the molecular weight or addition amount of the resin, thus the adjustment is flexible. Furthermore, due to the addition of a cold curing component, curing at room temperature is possible, which reduces energy consumption and costs compared to the high temperature curing of the conventional technology.

Embodiment 2

A method for preparing an ink-jet ink for color filter is provided in the present embodiment of the disclosure, which, as shown in FIG. 1, comprises the following steps.

S101: mixing 5 wt % to 40 wt % of styrene, 1 wt % to 30 wt % of a (meth)acrylic ester monomer, 0.5 wt % to 5 wt % of an acidic monomer, 0.25 wt % to 5 wt % of a cross-linking monomer, 0.05 wt % to 005 wt % of an emulsifier adjuvant, 0.05 wt % to 0.5 wt % of an oil soluble initiator so as to form a mixture, and adding 0.5 wt % to 10 wt % of an organic pigment or dye, and optionally 0.05 wt % to 0.5% of a nucleating promoter to the mixture to obtain an oil phase solution after being completely dissolved.

Examples of the (meth)acrylic ester monomer may include one or more of n-butyl acrylate, iso-butyl acrylate, n-butyl methacrylate, iso-butyl methacrylate, iso-octyl acrylate, methyl or ethyl acrylate, and methyl or ethyl methacrylate. Preferably, a mixture of n-butyl acrylate and methyl methacrylate may be selected.

Examples of the acidic monomer may include acrylic acid or methacrylic acid.

Examples of the cross-linking monomers may include one or more of divinylbenzene, ethylene glycol diacrylate, butylene glycol diacrylate, 1,6-hexanediol diacrylate, tripropylene glycol diacrylate, tetrapropylene glycol diacrylate, and trimethylolpropane triacrylate. Preferably, the mixture of 1,6-hexanediol tetrapropylene glycol diacrylate, and divinylbenzene can be selected.

Examples of the emulsifier adjuvant may include cetyl alcohol or cetane. Cetyl alcohol is preferred.

Examples of the oil soluble initiator may include benzoyl peroxide and azobisisobutyronitrile.

Examples of the nucleating promoter may include polystyrene microparticles having molecular weight of 20000 to 70000.

The organic pigment or dye may be a red pigment, yellow pigment, orange pigment, green pigment, blue pigment, purple pigment, or a mixture of two or more aforesaid pigments. Red pigments are primarily perylenes, Quinacridone or pyrrolopyroles, such as P.R.224, P.R.254, P.R.255, P.R.264, P.R.122, P.R.123, P.R.177, P.R.179, P.R.190, P.R.202, P.R.210, P.R.270, P.R.272, P.R.122, etc. Yellow pigments are exemplified by diazo compounds and heterocyclyl compounds, such as P.Y.1, P.Y.12, P.Y.3, P.Y.13, P.Y.83, P.Y.93, P.Y.94, P.Y.95, P.Y.109, P.Y.126, P.Y.127, P.Y.138, P.Y.139, P.Y.147, P.Y.150, P.Y.174, etc. Orange pigments are exemplified by diazo compounds, pyrrolidones, and benzidine pigments, such as P.O.5, P.O.13, P.O.16, P.O.34, P.O.36, P.O.48, P.O.49, P.O.71, P.O.73, etc. Green pigments are exemplified by P.G.37, P.G.36, P.G.7, etc. Blue pigments are exemplified by P.B.1, P.B.2, P.B.15, P.B.15:3, P.B.15:4, P.B.15:6, P.B.16, P.B.22, P.B.60, P.B.66, etc. Purple pigments are exemplified by P.V.32, P.V.36, P.V.38, P.V.39, P.V.23, P.V.9, P.V.1, etc.

S102: dissolving 0.05 wt % to 2 wt % of an emulsifier and 0.05 wt % to 2 wt % of buffering agent to 40 wt % to 90 wt % of deionized water to obtain an aqueous phase solution.

Examples of the emulsifier may include sodium dodecyl sulfate.

Examples of the buffering agent may include sodium bicarbonate or aqueous ammonia.

S103: mixing the oil phase solution with the aqueous phase solution to obtain a fine emulsion after agitation and homogenization.

For example, the oil phase solution and the aqueous phase solution may be continuously agitated at 600 to 1,300 rpm for 15 to 30 min.

Examples of homogenization may include homogenization with a high pressure micro-jet fluid device or a ultrasonic device.

S104: heating the fine emulsion to the reaction temperature, adding 0.05 wt % to 0.5 wt % of a water soluble initiator to initiate polymerization, and after the polymerization, adjusting pH value to 9~10; and obtaining an aqueous pigment dispersion by filtration.

The aqueous pigment dispersion is preferably an aqueous nano pigment dispersion, and the pigment in nano scale is helpful to ensure high transmissivity, colour purity, and contrast ratio. The fine emulsion can be used to obtain the aqueous nano pigment dispersion.

For example, inert gas such as nitrogen gas may be introduced during the heating process to improve the safety of the reaction.

Examples of the water soluble initiator may include potassium persulfate or ammonium persulfate. Preferably, potassium persulfate may be selected.

Examples of the reaction temperature may be in the range of 60 to 90° C., preferably, 70 to 80° C.

S105: adding a cold curing component to the aqueous nano pigment dispersion, and mixing evenly to obtain the ink-jet ink for color filter.

For example, the cold curing component may comprise an acrylic ester emulsion containing a first cold curing component and a second cold curing component. The first cold curing component may comprise an active carbonyl group, and the second cold curing component may comprise hydrazides; or the first cold curing component may comprise an acetoacetyloxy group, and the second cold curing component may comprise polyamines.

The solid content of the acrylic ester emulsion may be in the range of 10% to 60%, and its pH value is in the range of 9 to 10.

The glass temperature of the acrylic ester emulsion may, for example, be −20 to 90° C., and preferably, 0° C. to 50° C. may be selected.

Compared with the conventional method, a fine emulsion polymerization method is employed in the embodiment of the disclosure to prepare an aqueous pigment dispersion. Thus, an aqueous system is employed so as to avoid the environmental pollution caused by volatilization of solvents, reduce the harm to the health of artisans, and reduce the risk of fire. Moreover, the viscosity of the ink can be adjusted by a thickening agent or modifying pH values without the need to alter the content or molecular weight the resin in the recipe, thus the viscosity adjustment is more flexible. Since the interior and the surface of emulsion particles form cross-link properly in the fine emulsion, the migration of the pigment particles within the emulsion particles or further exudation to the aqueous phase is prevented, which ensures the excellent color property of the pigment.

The mechanism of cold curing of the disclosure involves a combination of two cold curing components. The combination is between an active carbonyl monomer and a hydrazide, such as the combination between diacetone acrylamide and adipoyl hydrazide, or a combination between a compound containing an acetoacetyloxy group and a polyamine, such as the combination between acetoacetoxyethyl methacrylate and hexane diamine. The specific mechanism is that any of the aforesaid combinations can cross-link under acidic conditions to realize the curing of the coated film, but cannot cross-link under alkaline conditions. Therefore, in the embodiment of the disclosure, a certain amount of acidic monomers are added in preparing the nano pigment dispersion, then the ink is adjusted to alkaline with aqueous ammonia for example to prevent the reaction between cold curing components. Upon using, the acidic monomers start to function with the volatilization of the aqueous ammonia which makes the ink turn to acidic; then, the cold curing components can start to react with each other to effect the curing.

Embodiment 3

A method for the preparation of the ink get ink for color filter is provided in the present embodiment of the disclosure, which, as shown in FIG. 2, comprises the following steps.

S201: for example, mixing 35 g of styrene with polymerization inhibitor removed by evaporation, 5 g of n-butyl acrylate, 5 g of methyl methacrylate, 5 g of acrylic acid, 0.8 g of 1,6-hexanediol diacrylate, 1.7 g of tetrapropylene glycol diacrylate, 0.5 g of p-divinylbenzene, 1 g of cetyl alcohol, and 0.5 g of benzoyl peroxide form a mixture, and dissolving 1.8 g of organic pigment or dye to be dispersed into the aforesaid mixture to form an oil phase solution after being completely dissolved.

S202: for example, dissolving 3 g of sodium dodecyl sulfate and 2.2 g of sodium bicarbonate into 120 g of deionized water to form an aqueous phase solution.

S203: mixing the oil phase solution with the aqueous phase solution; for example, after agitating at 800 rpm for 15 min, transferring the mixture into a ultrasonic homogenizer for ultrasonic homogenization to form a fine emulsion.

S204: transferring the fine emulsion into a reactor; for example, heating to 80° C. with aeration of nitrogen gas; adding 0.5 g potassium persulfate to initiate polymerization; after the reaction of 3 h, cooling to room temperature; adjusting pH value to 9 with aqueous ammonia; and obtaining the aqueous nano pigment dispersion by filtration.

The resultant aqueous nano pigment dispersion is subject to tests, and the test results are shown in the following table 1.

TABLE 1

| Minimum particle size | 53.6 nm |
| Average particle size | 68.2 nm |
| Maximum particle size | 106.4 nm |

S205: adding 600 g of acrylic acid ester emulsion containing diacetone acrylamide (an example of the first cold curing component) into the prepared pigment dispersion, and then adding 10 g of adipoyl hydrazide (an example of the second cold curing component); and mixing the additions evenly to obtain the ink-jet is for color filter.

An example of the first cold curing component can be obtained by polymerizing the mixture monomers containing diacetone acrylamide (DAAM) in an emulsion. More specifically, an example of the preparing method includes: mixing 9 wt % of diacetone acrylamide, 12 wt % of methyl methacrylate, 4 wt % of butyl acrylate, 4 wt % of styrene, 1 wt % of a thermal initiator such as potassium peroxydisulfate, and 70 wt % of deionized water together and rendering the mixture to polymerize in an emulsion.

For the ink-jet ink for color filter provided in the present embodiment of the disclosure, an aqueous system is employed so as to avoid the high VOC production caused by volatilization of solvents, reduce environmental pollution, ensure the health of artisans, and in the meantime reduce the risk of fire. Moreover, since an aqueous system is employed, the viscosity of the ink can be adjusted by a thickening agent or modifying pH values. Compared with the conventional method, this adjustment is not dependent on the molecular weight or addition amount of the resin, thus the adjustment is flexible. Furthermore, due to the addition of a cold curing component, curing at room temperature is possible, which reduces energy consumption and costs compared to the high temperature curing of the conventional technology.

Embodiment 4

Another method for the preparation of the ink-jet link for color filter is provided in the present embodiment of the disclosure, which, as shown in FIG. 3, comprises the following steps.

S301: for example, mixing 26 g of styrene with polymerization inhibitor removed by evaporation, 10 g of methyl methacrylate, 5 g of iso-octyl acrylate, 5 g of methacrylic acid, 1.2 g of 1,6-hexanediol diacrylate, 1.5 g of tetrapropylene glycol diacrylate, 0.3 g of p-divinylbenzene, 0.8 g of cetyl alcohol, 0.2 g of cetane, and 0.5 g of azobisisobutyronitrile to form a mixture; and dissolving 1.6 g of organic pigment or dye to be dispersed into the aforesaid mixture to form an oil phase solution after being completely dissolved.

S302: for example, dissolving 3 g of sodium dodecyl sulfate and 2.2 g of sodium bicarbonate into 120 g of deionized water to form an aqueous phase solution.

S303: mixing the oil phase solution with the aqueous phase solution; for example, after agitating at 800 rpm for 15 min, homogenizing with high-pressure micro-jet fluid to form a fine emulsion.

S304: transferring the fine emulsion into a reactor; heating to 80° C. with aeration of nitrogen gas; adding 0.5 g potassium persulfate to initiate polymerization; after the reaction of 3 h, cooling to room temperature; adjusting pH value to 9 with aqueous ammonia for example; and obtaining the aqueous nano pigment dispersion by filtration.

S305: adding 550 g of acrylic acid ester emulsion containing acetoacetoxyethyl methacrylate (an example of the first cold curing component) into the prepared pigment dispersion, and then adding 8 g of hexane diamine (an example of the second cold curing component); and mixing evenly to obtain the ink-jet ink for color filter.

For the ink-jet ink for color filter provided in Embodiment 4 of the disclosure, an aqueous system is employed so as to avoid the high VOC production caused by volatilization of solvents, reduce environmental pollution, ensure the health of artisans, and in the meantime reduce the risk of fire. Moreover, since an aqueous system is employed, the viscosity of the ink can be adjusted by a thickening agent or modifying pH values. Compared with the conventional method, this adjustment is not dependent on the molecular weight or addition amount of the resin, thus the adjustment is flexible. Furthermore, due to the addition of a cold curing component, curing at room temperature is possible, which reduces energy consumption and costs compared to the high temperature curing of the conventional technology.

Embodiment 5

Figure 4:
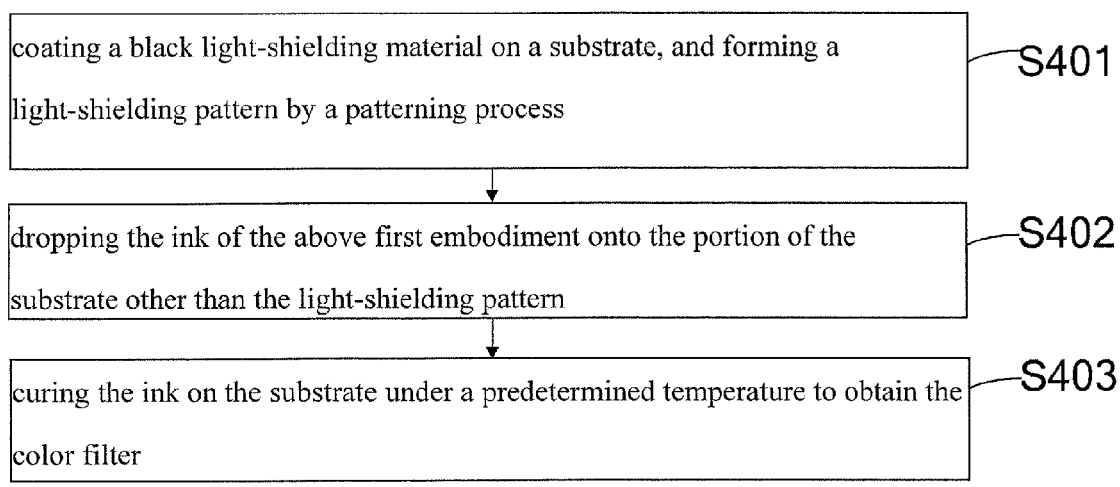
FIG. 4 is a flow chart of a method for preparing of a color filter.

The method for preparing of a color filter provided in Embodiment 5 of the disclosure comprises, as shown in FIG. 4, the following steps.

S401: coating a black light-shielding material on a substrate, and forming a light-shielding pattern by a patterning process.

Examples of the black light-shielding material may be a positive photoresist or a negative photoresist. Patterning process includes the procedures of exposure, developing, etching, stripping, and etc.

S402: dropping the ink of the above first embodiment onto the portion of the substrate other than the light-shielding pattern.

S403: curing the ink on the substrate under a predetermined temperature to obtain the color filter.

The set temperature may be the room temperature, that is, in the range of 10° C. to 25° C., or maybe in the range of 25° C. to 100° C., preferably 50° C. to 90° C.

In this embodiment, in order to effect the curing at a low temperature, a ketone-hydrazide cross-linking system is employed. The characteristics of the ketone-hydrazide cross-linking system are that the reaction occurs under an acidic catalysis condition. Therefore, an acidic monomer is added during manufacture, and the pH value of the product ink can be adjusted to alkaline with aqueous ammonia for example. During ink-jet ink curing, due to the volatilization of aqueous ammonia, the acidic group in the system will turn the system to acidic which catalyzes the ketone-hydrazide cross-linking reaction, so as to effect the curing at room temperature or a predetermined temperature, which greatly reduces the energy consumption.

It should be noted that the sequence of the procedure for the preparation of the oil phase solution and the aqueous phase solution is of no importance during actual operation. The preparations of the solutions may be in any sequence or simultaneous. Moreover, in addition to the ketone-hydrazide cross-linking system, other cold curing system may be employed for the cold curing, which are not individually enumerated here and shall all fall into the scope of the claims of the disclosure.

The described embodiments merely provide preferable embodiments of the disclosure, rather than limit the disclosure. As to the scope of the disclosure, the claims shall control. Modification on the basis of the disclosure which are common knowledge to skilled artisans shall fall into the scope of the claims of the disclosure.

The aforementioned description is merely specific embodiments of the disclosure. However, the scope of the disclosure is not limited by it. Any skilled artisan familiar with the art will readily conceive of alterations or substitutions within the scope of technical disclosure of the disclosure, which shall be encompassed by the disclosure. Therefore, the scope of the disclosure shall be determined by the scope of the appended claims.

The invention claimed is:

1. A method for preparing an ink-jet ink for color filter, comprising:

mixing 5 wt % to 40 wt % of styrene, 1 wt % to 30 wt % of a (meth)acrylic ester monomer, 0.5 wt % to 5 wt % of an acidic monomer, 0.25 wt % to 5 wt % of a cross-linking monomer, 0.05 wt % to 0.5 wt % of an emulsifier adjuvant, and 0.05 wt % to 0.5 wt % of an oil soluble initiator so as to form a mixture, and adding 0.5 wt % to 10 wt % of an organic pigment or dye, and optionally 0.05 wt % to 0.5% of a nucleating promoter to the mixture to obtain an oil phase solution after being dissolved;

dissolving 0.05 wt % to 2 wt % of an emulsifier and 0.05 wt % to 2 wt % of buffering agent to 40 wt % to 90 wt % of deionized water to obtain an aqueous phase solution;

mixing the oil phase solution with the aqueous phase solution to obtain a fine emulsion after agitation and homogenization;

heating the fine emulsion to an reaction temperature, adding 0.05 wt % to 0.5 wt % of a water soluble initiator to initiate polymerization, after the polymerization adjusting pH value to 9~10, and obtaining an aqueous nano pigment dispersion by filtration; and adding a cold curing component to the aqueous nano pigment dispersion, and mixing evenly to obtain the ink-jet ink for color filter.

2. The method for preparation according to claim 1, wherein the (meth)acrylic ester monomer is selected from one or more of n-butyl acrylate, iso-butyl acrylate, n-butyl methacrylate, iso-butyl methacrylate, iso-octyl acrylate, methyl or ethyl acrylate, and methyl or ethyl methacrylate.

3. The method for preparation according to claim 1, wherein the cross-linking monomer is selected from one ore more of divinylbenzene, ethylene glycol diacrylate, butylene glycol diacrylate, 1,6-hexanediol diacrylate, tripropylene glycol diacrylate, tetrapropylene glycol diacrylate, and trimethylolpropane triacrylate.

4. The method for preparation according to claim 1, wherein the nucleating promoter comprises polystyrene microparticles having molecular weight of 20,000 to 70,000.

5. The method for preparation according to claim 1, where the acidic monomer includes acrylic acid or methacrylic acid.

6. The method for preparation according to claim 1, wherein the mixture of the oil phase solution and the aqueous phase solution is continuously agitated at 600 rpm to 1,300 rpm for 15 to 30 min.

7. The method for preparation according to claim 1, wherein the oil soluble initiator includes benzoyl peroxide and 2,2-azobisisobutyronitrile.

8. The method for preparation according to claim 1, wherein the cold curing component comprises:
   an acrylic ester emulsion containing a first cold curing component, and
   a second cold curing component,
   wherein the first cold curing component comprises an active carbonyl group, and the second cold curing component comprises a hydrazide; or the first cold curing component comprises an acetoacetyloxy group, and the second cold curing component comprises a polyamine.

9. The method for preparation according to claim 8, wherein pH value of the acrylic ester emulsion is 9 to 10.

\* \* \* \* \*